(No Model.)
J. E. FISHER.
VEHICLE WHEEL.
No. 390,762. Patented Oct. 9, 1888.
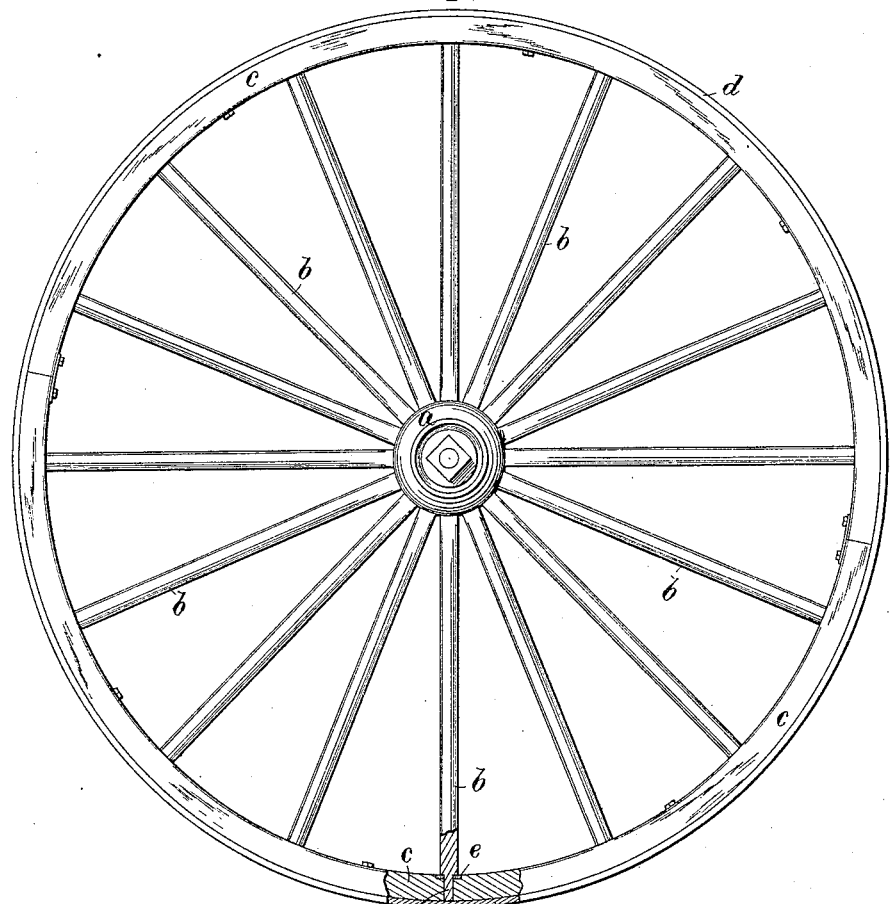
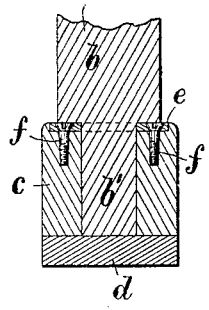
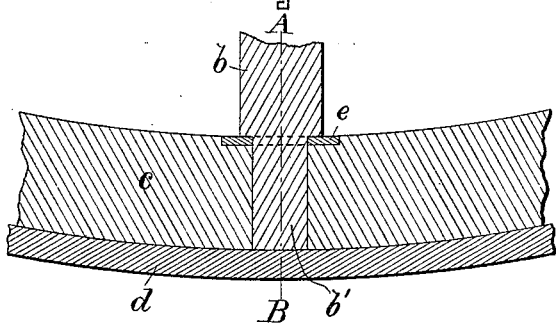
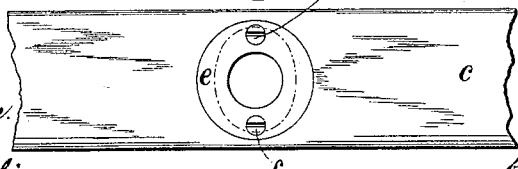
Witnesses.
Henry Chadbourn.
Zelma R. Schelin.
Inventor.
John E. Fisher.
by Alban Andrén.
his atty.

UNITED STATES PATENT OFFICE.

JOHN E. FISHER, OF BOSTON, MASSACHUSETTS.

VEHICLE-WHEEL.

SPECIFICATION forming part of Letters Patent No. 390,762, dated October 9, 1888.

Application filed June 28, 1888. Serial No. 278,406. (No model.)

*To all whom it may concern:*

Be it known that I, JOHN E. FISHER, a citizen of the United States, and a resident of Boston, in the county of Suffolk and State of Massachusetts, have invented new and useful Improvements in Vehicle-Wheels, of which the following, taken in connection with the accompanying drawings, is a specification.

This invention relates to improvements in vehicle-wheels, and it is carried out as follows, reference being had to the accompanying drawings, wherein—

Figure 1 represents a side view of the improved wheel, shown partly in section. Fig. 2 represents a detail longitudinal section of one of the spokes and a portion of the rim. Fig. 3 represents a cross-section on the line A B, shown in Fig. 2. Fig. 4 represents an inside view of a portion of the wheel-felly.

Similar letters refer to similar parts wherever they occur on the different parts of the drawings.

The object of my invention is to prevent the shoulders at the outer ends of the spokes from disintegrating and wearing out or breaking down the fibers on the interior portion of the felly, as well as to prevent the latter from splitting at the places where the spokes pass through it.

By the use of my invention the wheel is prevented from wearing out or working loose at the junction of the spokes and felly, and therefore the frequent resetting of the tire is obviated.

The greatest wearing of a vehicle-wheel ordinarily takes place on the felly where the shoulders of the spokes rest against the interior portion of said felly, on account of the end fibers of the spokes being more wear-resisting than the longitudinal fibers of the felly; and to prevent such wear and disintegrating of the felly I secure to its interior portion opposite to the spokes metal rings or washers, which are secured, by means of nails, screws, or rivets, to the felly, as will hereinafter be described.

$a$ represents the hub of the wheel. $b\ b$ are the spokes, and $c$ is the felly, with its metal tire $d$, as usual. On the interior of the felly $c$, I locate, between it and the shoulder of each spoke $b$, a metal washer, $e$, which is preferably located in a corresponding recess on the interior of the felly $c$, and secured to the latter by means of nails, screws, or rivets, $f\ f$, or equivalent means, as shown.

The washer $e$ has a central perforation, through which passes the reduced outer end, $b'$, of the spoke $b$, as shown. The metal ring or washer $e$ is secured to the interior of the felly $c$ for two reasons—namely, first, to hold it in close contact with said felly, so as to prevent rubbing, chafing, or wearing between said parts, and, secondly, to prevent the splitting of the felly at the part where the spoke passes through it, such washer and its holding-screws, nails, or rivets serving the purpose of a tie for this purpose.

The rings or washers $e$, being secured to the interior of the felly, thus serve as firm metal seats for the purpose above mentioned, by which the life and durability of the wheel are materially increased.

What I wish to secure by Letters Patent, and claim, is—

In a vehicle-wheel, the annular metal washer $e$, having a central perforation for the reception of the outer reduced end of the spoke, said washer being adapted to serve as a rest for the shouldered end of the spoke, and having fastening screws or rivets $f\ f$ passing through perforations in said washer, and adapted to serve, in connection with said washer, as a means to prevent the splitting of the felly at its junction with the spokes, and to hold the washer firmly secured to the felly, substantially as specified.

In testimony whereof I have signed my name to this specification, in the presence of two subscribing witnesses, on this 25th day of June, A. D. 1888.

JOHN E. FISHER.

Witnesses:
HENRY CHADBOURN,
WHITFIELD W. BAXTER.